United States Patent
Tachiki (10) Patent No.: US 10,525,562 B2
(45) Date of Patent: Jan. 7, 2020

(54) ROTARY TABLE DEVICE

(71) Applicant: FANUC CORPORATION, Yamanashi (JP)

(72) Inventor: Shingo Tachiki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 5 days.

(21) Appl. No.: 15/971,095

(22) Filed: May 4, 2018

(65) Prior Publication Data

US 2018/0361524 A1 Dec. 20, 2018

(30) Foreign Application Priority Data

Jun. 16, 2017 (JP) .................................. 2017-118405

(51) Int. Cl.
*B23Q 16/10* (2006.01)

(52) U.S. Cl.
CPC ...... *B23Q 16/105* (2013.01); *B23Q 2220/004* (2013.01)

(58) Field of Classification Search
CPC ...... B23Q 16/105; B23Q 16/10; B23Q 16/08; B23Q 16/02; B23Q 2220/004; Y10T 74/1494
See application file for complete search history.

(56) References Cited

U.S. PATENT DOCUMENTS

| | | | | |
|---|---|---|---|---|
| 8,770,065 | B2* | 7/2014 | Petrescu | B23Q 16/06 74/813 L |
| 2013/0047896 | A1* | 2/2013 | Fujimoto | B23Q 1/0027 108/50.11 |

FOREIGN PATENT DOCUMENTS

| | | |
|---|---|---|
| CN | 101918173 A | 12/2010 |
| CN | 202192464 U | 4/2012 |
| JP | 2003-071667 A | 3/2003 |
| JP | 2007-144579 A | 6/2007 |
| JP | 2010214492 A | 9/2010 |

(Continued)

OTHER PUBLICATIONS

An Office Action mailed by the Japanese Patent Office dated Jan. 8, 2019, which corresponds to Japanese Patent Application No. 2017-118405 and is related to U.S. Appl. No. 15/971,095.

(Continued)

*Primary Examiner* — Richard W Ridley
*Assistant Examiner* — Brian J McGovern
(74) *Attorney, Agent, or Firm* — Studebaker & Brackett PC (57) ABSTRACT

A rotary table device includes: a case; a spindle having an axis hole that is provided rotatably in the case and extends through along an axis direction of a center portion; a rotary joint having a rotary shaft attached non-rotatably to the axis hole of the spindle; and a clamp mechanism arranged in a rear end side of the case and having a component attached non-rotatably to the spindle, the rotary shaft having an attachment flange unit with the spindle in a front end portion, the rotary shaft inserted to the axis hole from the front end side of the spindle to be attached to the spindle by the attachment flange unit, a rear end portion of the rotary shaft projecting from a rear end surface of the spindle, the component of the clamp mechanism mounted to a rear end portion of the rotary shaft projecting from the rear end surface of the spindle from a rear end side, and contacting with and externally fit to an outer circumferential surface of the rear end portion.

1 Claim, 8 Drawing Sheets

(56) References Cited

FOREIGN PATENT DOCUMENTS

| JP | 2014-161995 A | 9/2014 |
|---|---|---|
| JP | 3195092 U | 12/2014 |

OTHER PUBLICATIONS

An Office Action mailed by the Chinese Patent Office dated Jun. 5, 2019, which corresponds to Chinese Patent Application No. 201810473350.8 and is related to U.S. Appl. No. 15/971,095; with partial English translation.

* cited by examiner

--Prior Art--

FIG. 7

--Prior Art--

FIG. 8

--Prior Art--

ROTARY TABLE DEVICE

This application is based on and claims the benefit of priority from Japanese Patent Application No. 2017-118405, filed on 16 Jun. 2017, the content of which is incorporated herein by reference.

BACKGROUND OF THE INVENTION

Field of the Invention

The present invention relates to a rotary table device including a clamp mechanism and a rotary joint.

Related Art

A rotary table device has a rotatable spindle, and performs indexing, or the like, with a workpiece, a fixture, and the like fixed to a surface plate of the spindle. Generally, a rotary table device includes a clamp mechanism that disable rotation of a spindle, for holding an indexing position. When a fixture is attached to a surface plate of a spindle, a rotary table device sometimes includes a rotary joint for feeding working fluid (hydraulic or compressed air) that operates the fixture.

Figure 6:
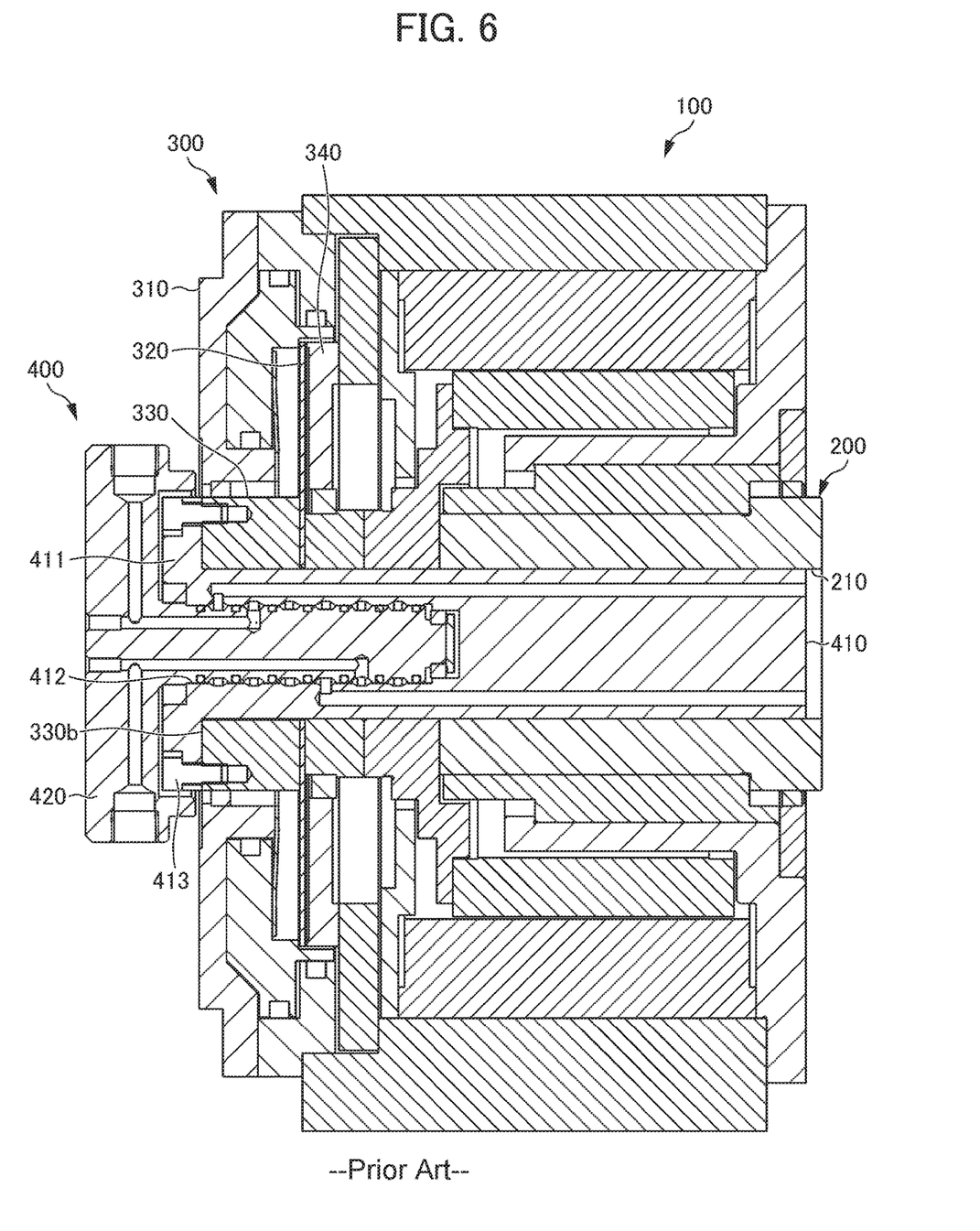
FIG. 6 is a cross sectional view showing a conventional rotary table device.

As a conventional rotary table device including a rotary joint, there is a rotary table device 100 as shown in FIG. 6. This rotary table device 100 has a spindle 200, a clamp mechanism 300, and a rotary joint 400. In this rotary table device 100, a "front end" refers to an end (a right end in FIG. 6) of a surface plate side mounted with a workpiece, a fixture, and the like, and a "rear end" refers to an opposite end (a left end in FIG. 6).

The clamp mechanism 300 is arranged in a rear end side of the spindle 200. The clamp mechanism 300 has a cylinder unit 310, a brake disk 320, a disk holder 330, and a clamp member 340. The brake disk 320 is fixed to the spindle 200 non-rotatably by the disk holder 330.

The rotary joint 400 is composed of a rotary shaft 410, and a distributor 420. The rotary shaft 410 has an attachment flange unit 411 in a rear end portion. The rotary shaft 410 is inserted to an axis hole 210 of the spindle 200 from a rear end side, and is fixed with a bolt 413 to a rear end surface 330b of the disk holder 330 by the attachment flange unit 411. The distributor 420 is inserted to a shaft hole 412 of the rotary shaft 410.

Patent Document 1: Japanese Unexamined Patent Application, Publication No. 2003-71667
Patent Document 2: Japanese Unexamined Patent Application, Publication No. 2007-144579
Patent Document 3: Japanese Unexamined Patent Application, Publication No. 2014-161995

SUMMARY OF THE INVENTION

For a rotary table device including a clamp mechanism, maintenance of the clamp mechanism itself, and parts related to a sensor attached to an inside of the clamp mechanism needs to be performed. For this maintenance, components of the clamp mechanism are detached, and are attached again after the maintenance.

Figure 7:
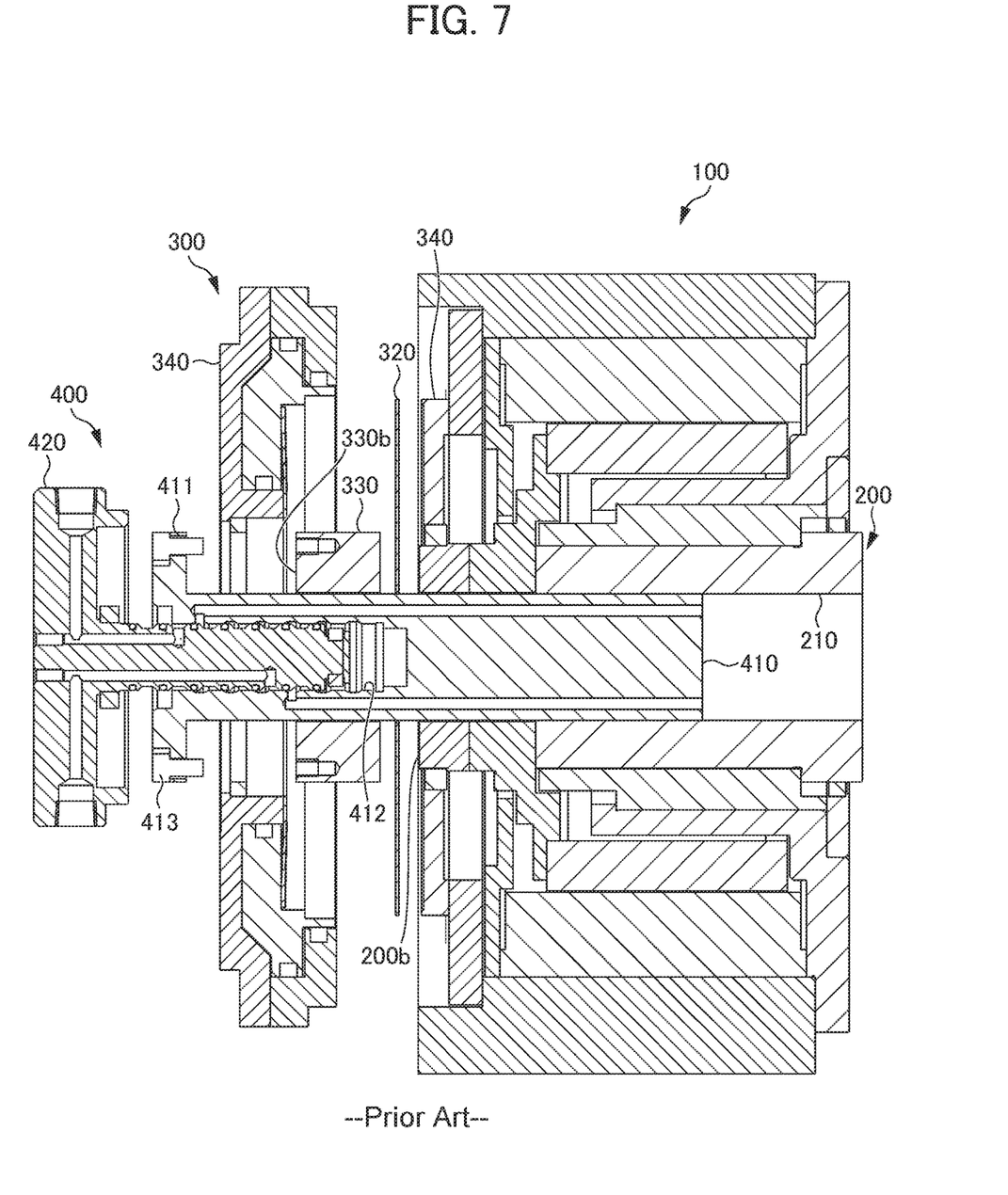
FIG. 7 is a cross sectional view explaining a situation in which a clamp mechanism of the conventional rotary table device shown in FIG. 6 is detached.
Figure 8:
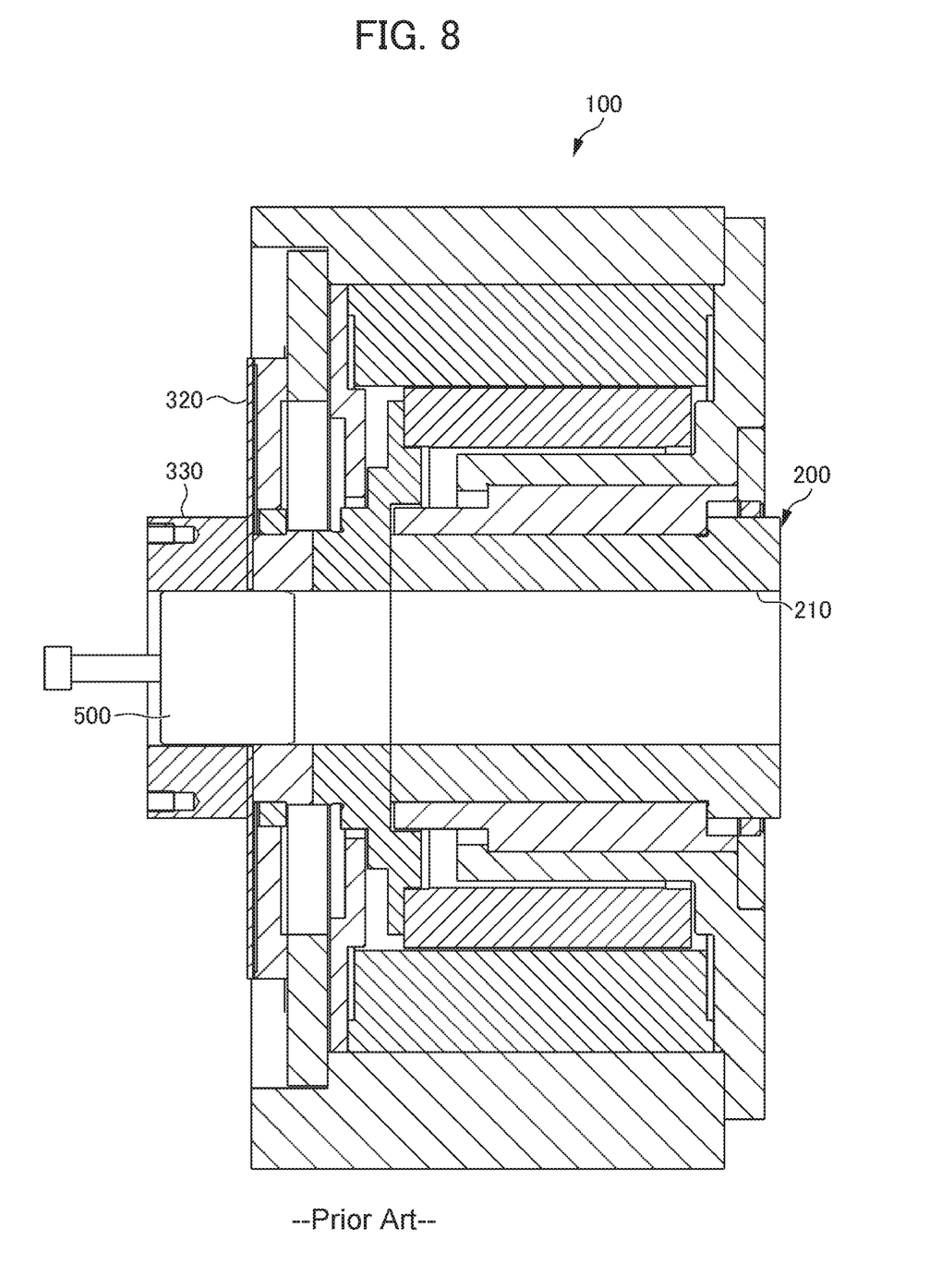
FIG. 8 is a cross sectional view showing a situation in which a brake disk and a disk holder are attached to the conventional rotary table device shown in FIG. 6.

Attachment work and detachment work of the components of the clamp mechanism 300 in the rotary table device 100 will be described with reference to FIG. 7 and FIG. 8. First, in the detachment work, the distributor 420 is detached from the rotary shaft 410. Next, the rotary shaft 410 is detached from the disk holder 330, and is drawn rearward from the axis hole 210 of the spindle 200. After that, the cylinder unit 340, the disk holder 330, and the brake disk 320 are detached.

On the other hand, in the attachment work, first, the brake disk 320 and the disk holder 330 are attached to the spindle 200 before the rotary shaft 410 is attached. This is because the rotary shaft 410 is fixed to the disk holder 330 by the flange unit 411. The brake disk 320 and the disk holder 330 need to be attached coaxially with the spindle 200 without eccentricity in order to prevent damage of an enclosing seal member, and the like. However, the spindle 200 of before the rotary shaft 410 is attached is hollow. Thus, as shown in FIG. 8, centering of the brake disk 320 and the disk holder 330 need to be performed by mounting a cylindrical centering fixture 500 to the axis hole 210 of the spindle 200.

After a centering work using the centering fixture 500, the brake disk 320 and the disk holder 330 are fixed to the spindle 200. After the removal of the centering fixture 500, as shown in FIG. 7, the rotary shaft 410 is inserted to the axis hole 210 of the spindle 200 from a rear end side of the spindle 200. After centering adjustment of the rotary shaft 410, the attachment flange unit 411 is fixed to the disk holder 330 by the bolt 413. After that, the cylinder unit 340 and the distributor 420 are attached. In the centering work, sometimes a dial gauge is used instead of the centering fixture 500.

In this way, in the conventional rotary table device, the rotary shaft needs to be detached every time the maintenance of the clamp mechanism is performed. After the maintenance, centering adjustment of the rotary shaft is necessary every time the rotary shaft is attached. In addition, when the clamp mechanism is attached, a centering work of components such as the brake disk, the disk holder, and the like, using the centering fixture, or the like is also needed. Accordingly, the conventional rotary table device has room for improvement in terms of making the maintenance of the clamp mechanism to be performed easily in a short time.

Thus, an object of the present invention is to provide a rotary table device in which maintenance of a clamp mechanism can be easily performed, and working time can be shortened.

(1) A rotary table device according to the present invention (for example, a rotary table device 1 described later) includes: a case (for example, a case 2 described later); a spindle (for example, a spindle 3 described later) having an axis hole (for example, an axis hole 31 described later) that is provided rotatably in the case and extends through along an axis direction of a center portion; a rotary joint (for example, a rotary joint 5 described later) having a rotary shaft (for example, a rotary shaft 6 described later) attached non-rotatably to the axis hole of the spindle; and a clamp mechanism (for example, a clamp mechanism 4 described later) arranged in a rear end side of the case and having a component attached non-rotatably to the spindle, the rotary shaft having an attachment flange unit (for example, an attachment flange unit 62 described later) with the spindle in a front end portion (for example, a front end portion 6a described later), the rotary shaft inserted to the axis hole from the from, end side of the spindle to be attached to the spindle by the attachment flange unit, a rear end portion (for example, a rear end portion 6b described later) of the rotary shaft projecting from a rear end surface of the spindle, the component of the clamp mechanism externally mounted to a rear end portion of the rotary shaft projecting from the rear end surface of the spindle from the rear end side, and contacting with and externally fit to an outer circumferential surface of the rear end portion.

(2) In the rotary table device according to (1), the component of the clamp mechanism may include a brake disk (for example, a brake disk 12 described later), and a disk holder (for example, a disk holder 43 described later) that fixes the brake disk to the spindle.

(3) In the rotary table device according to (1) or (2), the outer circumferential surface of the rear end portion of the rotary shaft projecting from the rear end surface of the spindle has a fitting part (for example, a fitting part 65 described later) that contacts with an inner circumferential surface of the component, in a region in which the component of the clamp mechanism is externally fit, and a rear end side from the fitting part of the rotary shaft may be an escape part (for example, an escape part 66 described later) that does not contact with the inner circumferential surface of the component.

According to the present invention, a rotary table device in which maintenance of a clamp mechanism can be easily performed, and working time can be shortened can be provided.

DETAILED DESCRIPTION OF THE INVENTION

Figure 1:
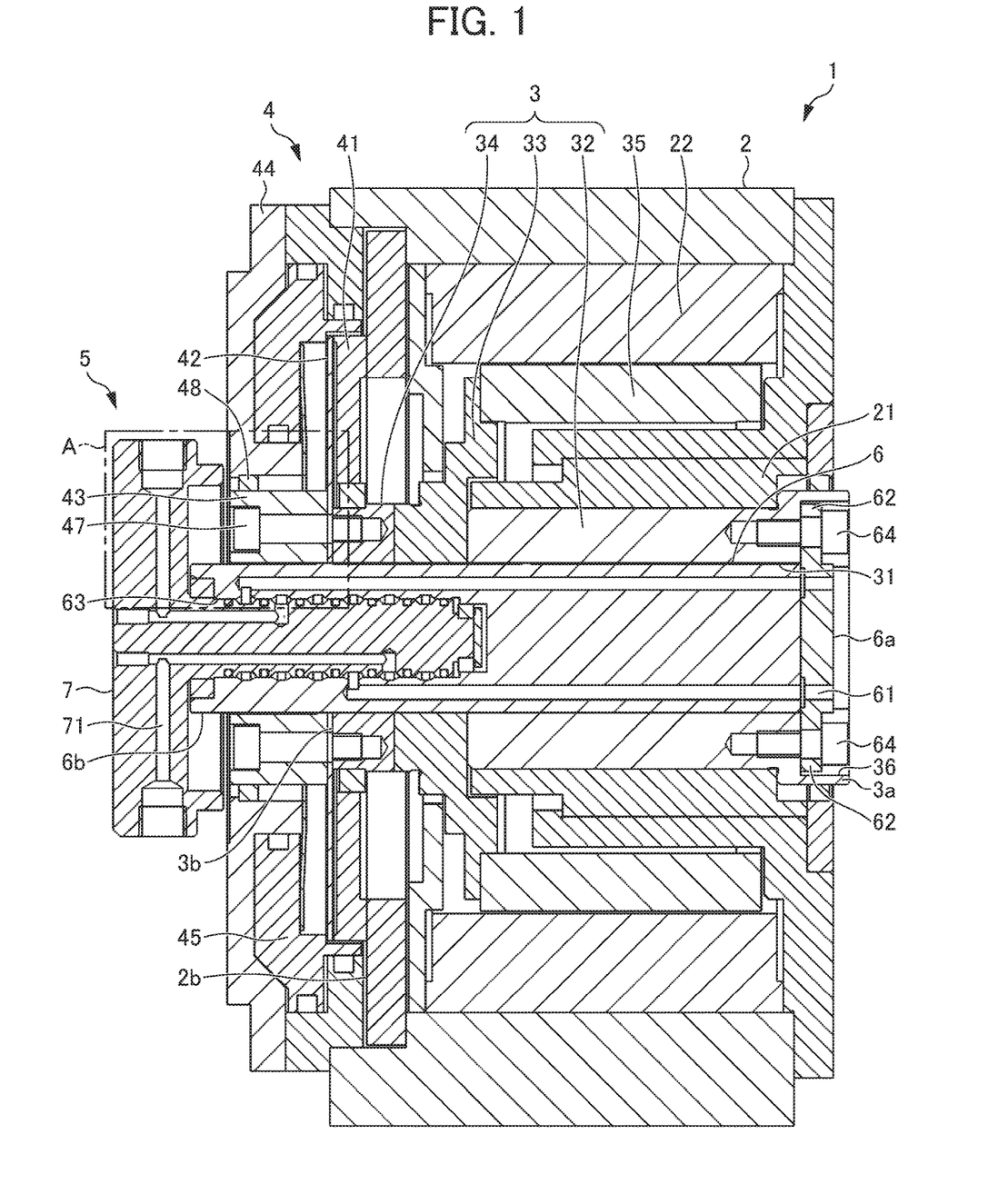
FIG. 1 is a cross sectional view showing an example of a rotary table device according to the present invention.
Figure 2:
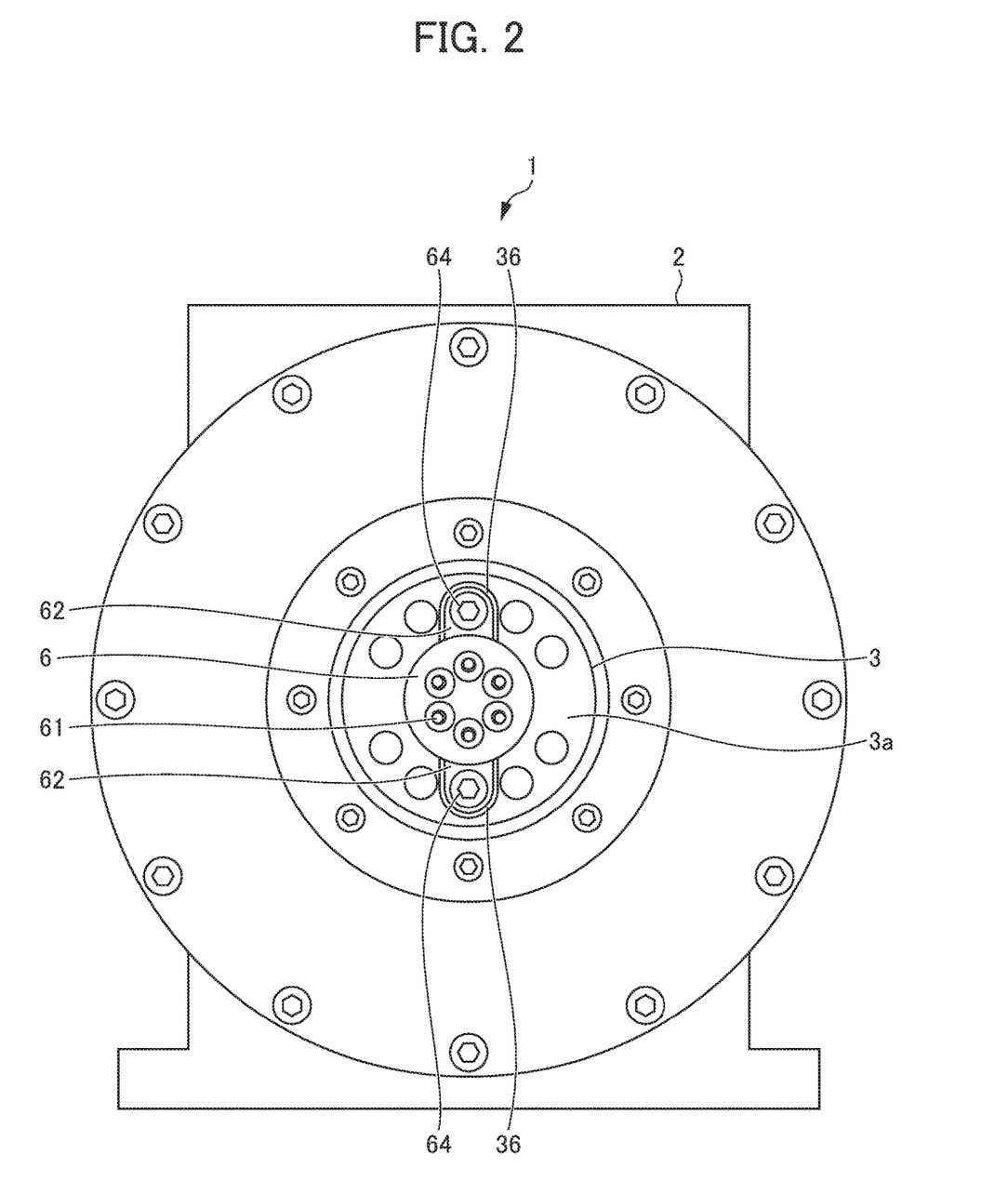
FIG. 2 is a front view viewing the rotary table device shown in FIG. 1 from a front end surface side.
Figure 3:
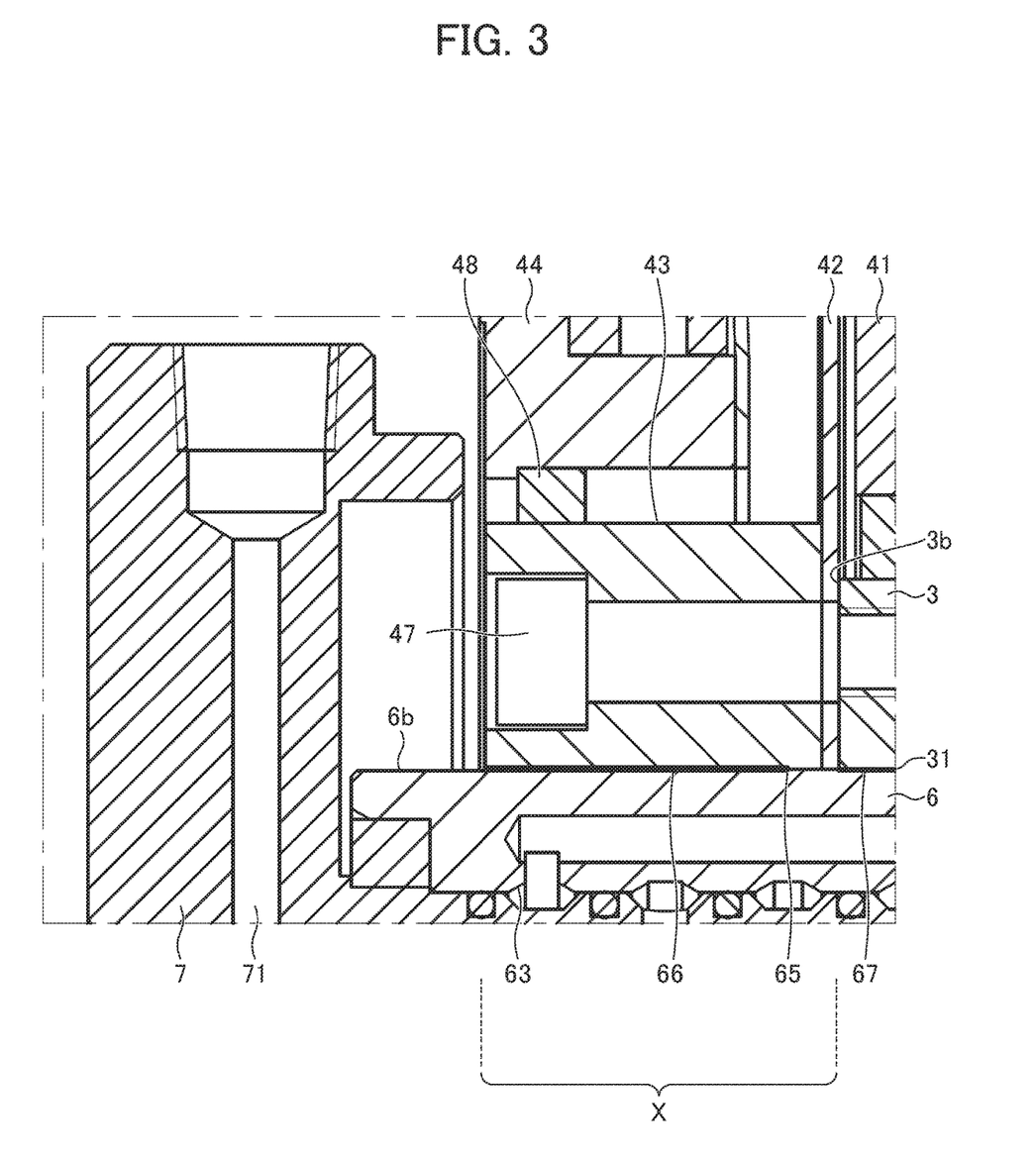
FIG. 3 is an enlarged view of A portion enclosed by a square in FIG. 1.

An embodiment of the present invention will be described below with reference to drawings. FIG. 1 is a cross sectional view showing an example of a rotary table device according to the present invention. FIG. 2 is a front view viewing the rotary table device shown in FIG. 1 from a front end surface side. FIG. 3 is an enlarged view of A portion enclosed by a square in FIG. 1. In FIG. 1, a rotary table device 1 includes a case 2, a spindle 3, a clamp mechanism 4, and a rotary joint 5. In the rotary table device 1, a "front end" refers to an end (a right end in FIG. 1) of a surface plate side of the spindle 3 mounted with a workpiece, a fixture, and the like, and a "rear end" refers to an opposite end from the surface plate (a left end in FIG. 1).

The spindle 3 is supported rotatably in the case 2 via a main bearing 21. A front end surface 3a of the spindle 3 composes the surface plate attached with the workpiece, the fixture, and the like. An axis hole 31 having a cross sectional circle shape extending through along an axial direction, is formed in a center portion of the spindle 3. The spindle 3 is composed by integral assembly of a cylindrical spindle body 32, a rotor unit 33 extending out in a radial direction further than the spindle body 32, and a rear plate portion 34 order from the front end side. A rotor 35 is fixed to the rotor unit 33. A stator 22 is fixed to an inside of the case 2. The stator 22 encloses the periphery of the rotor 35.

The clamp mechanism 4 is arranged in the rear end side of the spindle 3, and is composed of a clamp member 41, a brake disk 42, a disk holder 43, and a cylinder unit 44.

The clamp member 41 is a ring-shaped member, and is arranged so as to be externally fit to the rear end portion of the spindle 3. The clamp member 41 is fixed to the rear end surface 2b of the case 2 non-rotatably with respect to the case 2, and coaxially with the spindle 3.

The brake disk 42 is formed of a ring-shaped plate member having an almost same outer diameter as the clamp member 41. The brake disk 42 is fixed to a rear end surface 3b of the spindle 3 non-rotatably to the spindle 3 and coaxially with the spindle 3, by a ring-shaped disk holder 43 having a smaller outer diameter than the clamp member 41. These brake disk 12 and disk holder 43 are examples of "components attached to the spindle non-rotatably" in the present invention.

The cylinder unit 44 is a ring-shaped unit, and is attached to the rear end surface 2b of the case 2 non-rotatably with respect to the case 2, and coaxially with the spindle 3. The cylinder unit 44 is externally fit to the disk holder 43 via an oil seal 48, and covers the entire clamp member 41 and the brake disk 42.

The cylinder unit 44 includes a piston 45 that is movable by working fluid of hydraulic or compressed air. The piston 45 is arranged so as to sandwich the brake disk 42 with the clamp member 41. When moving in the clamp member 41 side, the piston 45 clamps the brake disk 42 with the clamp member 41, and makes the spindle 3 to be in a non-rotatable static state. On the other hand, when moving in the opposite side from the clamp member 41, the piston 45 unclamps the brake disk 42, and makes the spindle 3 to be rotatable.

The rotary joint 5 is composed of a rotary shaft 6 and a distributor 7. The rotary joint 5 causes the working fluid of hydraulic or compressed air to flow into the rotary shaft 6 through a plurality of fluid passages 71 formed in the distributor 7. Further, the rotary joint 5 causes the working fluid to flow out in the front end surface 3a side of the spindle 3 through the plurality of fluid passages 61 formed in the rotary shaft 6.

The rotary shaft 6 has a pair of attachment flange units 62 with respect to the spindle 3, in the front end portion 6a. The pair of attachment flange units 62 are provided in diagonal positions of the front end portion 6a of the rotary shaft 6 so as to extend out in a radial direction of the rotary shaft 6. The rear end portion 6b of the rotary shaft 6 extends while remaining the cylindrical shape, and has a shaft hole 63 to which the distributor 7 is inserted, in a center portion.

The rotary shaft 6 is inserted to the axis hole 31 from the front end surface 3a side of the spindle 3. Two groove portions 36 are formed in diagonal positions of the axis hole 31 in the front end surface 3a of the spindle 3. The attachment flange units 62 of the rotary shaft 6 are accommodated in the groove portions 36, and are attached to the spindle 3 by bolts 64 from the front end surface 3a side of the spindle 3. Thereby, the rotary shaft 6 is fixed to the spindle 3 non-rotatably and coaxially. Since head portions of the bolts 64 are also accommodated in the groove portions 36, the front end portion 6a of the rotary shaft 6 does not project from the front end surface 3a of the spindle 3.

The rotary shaft 6 is longer than a length of the spindle 3 in axial direction of. Thus, the rear end portion 6b of the rotary shaft 6 projects from the rear end surface 3b or the spindle 3. The rear end portion 6b of the rotary shaft 6 is a portion to which the brake disk 42 and the disk holder 43 of the clamp mechanism 4 are mounted and externally fit from the rear end side of the rotary shaft 6. The rear end portion 6b of the rotary shaft 6 extends through the brake disk 42 and the disk holder 43. The brake disk 42 and the disk holder 43 contact with and are externally fit to an outer circumferential surface of the rear end portion 6b of the rotary shaft 6.

As shown in FIG. 3, the rear end portion 6b of the rotary shaft 6 projecting from the rear end surface 3b of the spindle 3 has a fitting part 65 that contacts with inner circumferential surfaces of the brake disk 42 and the disk holder 43, in a region X in which the brake disk 42 and the disk holder 43 are externally fit.

The fitting part 65 is a portion formed to have a partly slightly large diameter in the rear end portion 6b of the rotary shaft 6. The fitting part 65 is arranged adjacent to the rear end surface 3b of the spindle 3. However, an outer diameter of the fitting part 65 is the same as or slightly smaller than an inner diameter of the axis hole 31. A length of the fitting part 65 in the axial direction is longer than a length (thickness) of the brake disk 42 in the axial direction, and is sufficiently shorter than the sum length of the brake disk 42 and the disk holder 43 in the axial direction. The outer diameter of the fitting part 65 is formed to be substantially the same as the inner diameters of the brake disk 42 and the disk holder 43. Thus, the entire inner circumferential surface of the brake disk 42 mounted to the rear end portion 6b of the rotary shaft 6 from the rear end side of the rotary shaft 6, and the front end side of the inner circumferential surface of the disk holder 43 contact with the outer circumferential surface of the fitting part 65. Accordingly, the brake disk 42 and the disk holder 43 contact with the fitting part 65, are positioned in the radial direction, and are attached coaxially with the spindle 3 by being externally fit to the rear end portion 6b of the rotary shaft 6.

On the other hand, the rear end side from the fitting part 65 in the rotary shaft 6 has an escape part 66 that does not contact with the inner circumferential surfaces of the brake disk 42 and the disk holder 43. The escape part 66 is a portion formed to have slightly smaller diameter than that of the fitting part 65. Thus, a slight gap is formed in between the disk holder 43 and the rotary shaft 6 that is in the rear end side from the fitting part 65. Thus, resistance of when the brake disk 42 and the disk holder 43 are externally fit to the rear end portion 6b of the rotary shaft 6 can be small, and a fitting work can be easily performed.

The front end side from the fitting part 65 of the rotary shaft 6 described in the present embodiment has an escape part 67 having a slightly smaller diameter than that of the fitting part 65. Thus, resistance of when the rotary shaft 6 is inserted to the axis hole 31 from the front end surface 3a side of the spindle 3 can also be smaller, and an insertion work can be easily performed.

The distributor 7 is inserted to the shaft hole 63 of the rotary shaft 6, and is fixed to the cylinder unit 44 by a bolt not shown. Thus, the distributor 7 is attached non-rotatably to the case 2 via the cylinder unit 44.

Figure 4:
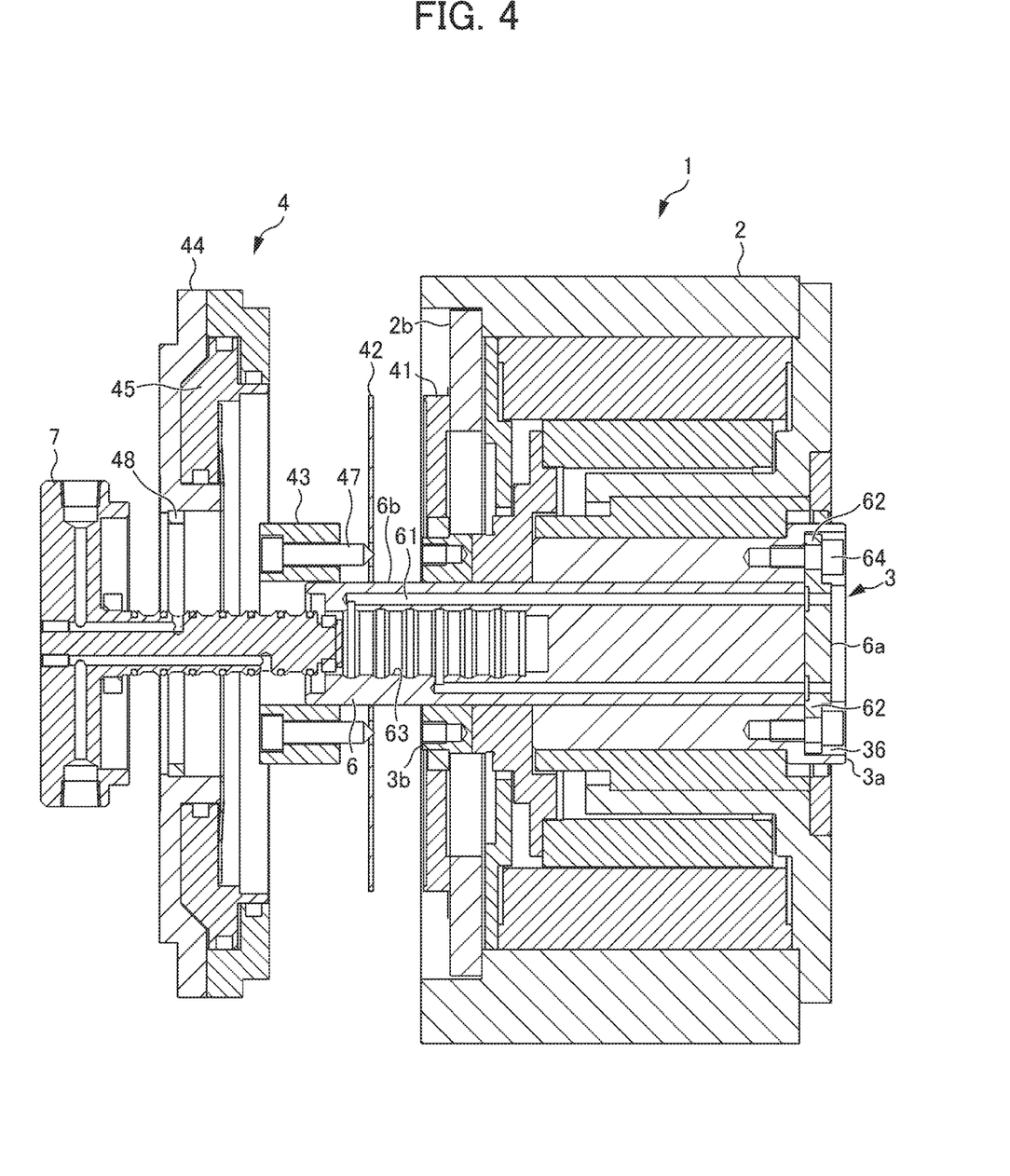
FIG. 4 is a cross sectional view explaining a situation in which a clamp mechanism of the rotary table device shown in FIG. 1 is detached.
Figure 5:
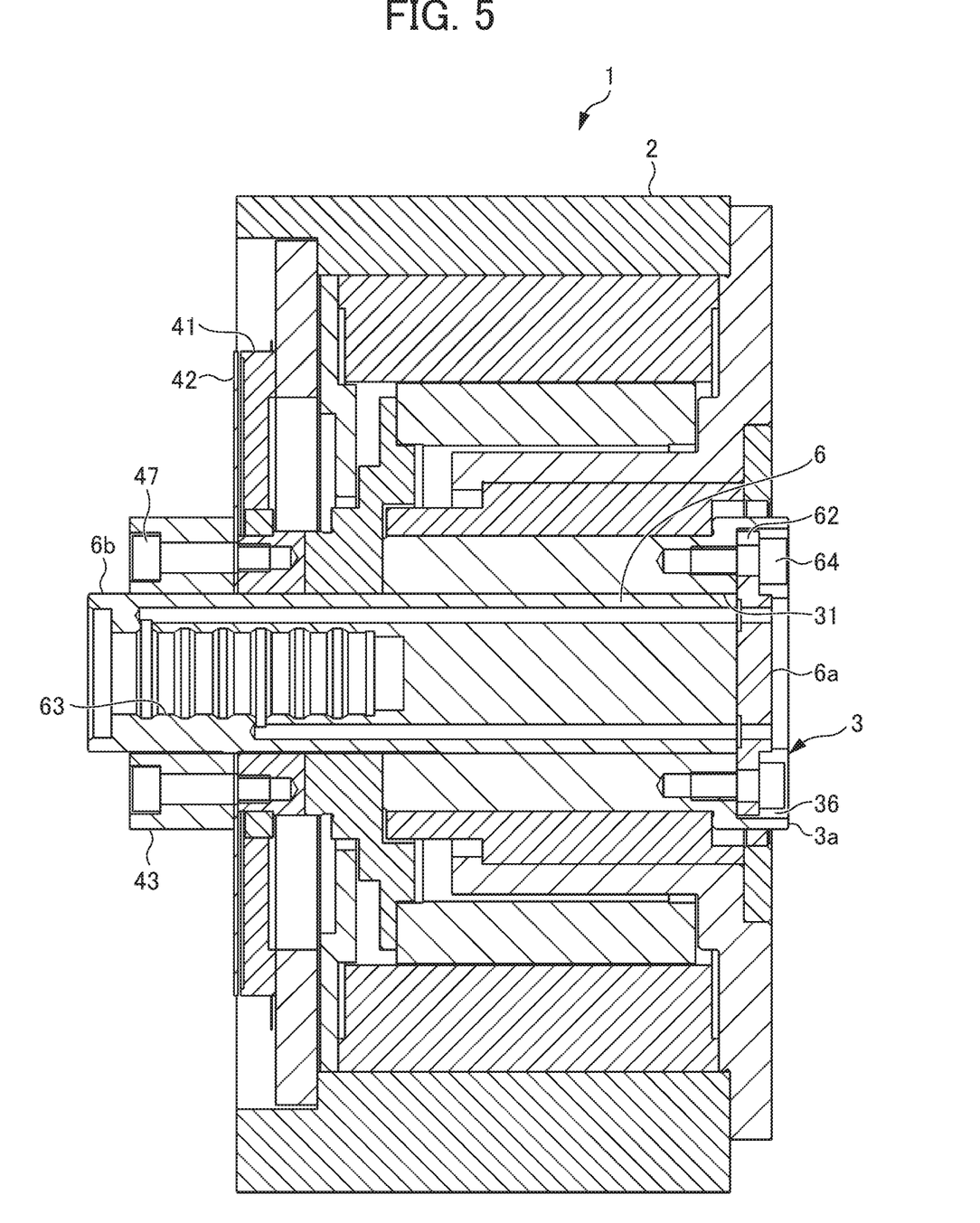
FIG. 5 is a cross sectional view showing a state in which a brake disk and a disk holder are attached to a rotary shaft of the rotary table device after maintenance.

Next, detachment work and attachment work of each component of the clamp mechanism 4 in this rotary table device 1 will be described with reference to FIG. 4 and FIG. 5. FIG. 4 is a cross sectional view explaining a situation in which the clamp mechanism 4 of the rotary table device 1 shown in FIG. 1 is detached. FIG. 5 is a cross sectional view showing a state in which the brake disk 42 and the disk holder 43 are attached to the rotary shaft 6 of the rotary table device 1 after the maintenance. First, in the detachment work, the distributor 7 is detached from the cylinder unit 44, and is drawn rearward from the shaft hole 63 of the rotary shaft 6. After that, the cylinder unit 44 is detached from the case 2. Then, the disk holder 13 and the brake disk 42 that are externally fit to the rotary shaft 6 are sequentially detached. Thereby, the components of the clamp mechanism 4 needed for the maintenance are detached. At this time, the rotary shaft 6 is remained to be fixed to the spindle 3, and detachment is not necessary.

On the other hand, in the attachment work, the brake disk 42 and the disk holder 43 are mounted to and externally fit to the rear end portion 6b of the rotary shaft 6 projecting from the rear end surface 3b of the spindle 3, from the rear end side of the rotary shaft 6. At this time, the inner circumferential surfaces of the brake disk 42 and the disk holder 43 contact with the outer circumferential surface of the rear end portion 6b of the rotary shaft 6, particularly, the outer circumferential surface of the fitting part 65. Since the rotary shaft 6 fixed in a state of being already positioned in the axis hole 31 of the spindle 3, the brake disk 42 and the disk holder 43 are positioned only by externally fitting the brake disk 42 and the disk holder 43 to the rear end portion 6b of the rotary shaft 6.

In this way, the attachment of the brake disk 42 and the disk holder 43 is performed by utilizing the rotary shaft 6 instead of a centering fixture. Accordingly, the brake disk 42 and the disk holder 43 are centered only by being externally fit to the rear end portion 6b of the rotary shaft 6. After the external fitting, the brake disk 42 and the disk holder 43 are fixed to the spindle 3 non-rotatably and coaxially by the bolt 47. At the time of this attachment of the brake disk 42 and the disk holder 43, a centering work using a centering fixture, a dial gauge, or the like as conventional one is not necessary at all. After that, the cylinder unit 44 and the distributor 7 are attached.

In this way, according to the rotary table device 1 according to the present invention, attachment and detachment of the component of the clamp mechanism 4 can be performed without detaching the rotary shaft 6 from the spindle 3. Accordingly, at the time of maintenance of the clamp mechanism 4, troublesome works for attachment and detachment of the rotary shaft 6 are not necessary, and the maintenance work can be easily performed. At the time of attachment of the brake disk 42 and the disk holder 43, a centering work using a centering fixture, or the like is not, necessary. In addition, there is no need to perform centering of the rotary shaft every time the maintenance is performed. Thus, working time required for the maintenance can be significantly reduced.

EXPLANATION OF REFERENCE NUMERALS

1 Rotary table device
2 Case
3 Spindle
3b Rear end surface
31 Axis hole
4 Clamp mechanism
42 Brake disk
43 Disk holder
5 Rotary joint
6 Rotary shaft
6a Front end portion
6b Rear end portion
62 Attachment flange unit

What is claimed is:

1. A rotary table device comprising:
   a case;
   a spindle having an axis hole, the spindle provided rotatably in the case and the axis hole extending through the spindle along an axis direction of a center portion;
   a rotary joint having a rotary shaft attached non-rotatably to the axis hole of the spindle; and
   a clamp mechanism arranged in a rear end side of the case and having a component attached non-rotatably to the spindle,
   the rotary shaft having a fluid passage therein that causes working fluid flowing from the rotary joint to flow out to a front end side of the spindle, the rotary shaft having an attachment flange unit in a front end portion, the rotary shaft inserted to the axis hole from the front end side of the spindle to be attached to the spindle by the attachment flange unit, a rear end portion of the rotary shaft projecting from a rear end surface of the spindle,
   the component of the clamp mechanism mounted to the rear end portion of the rotary shaft projecting from the rear end surface of the spindle from a rear end side of the rotary shaft, the component contacting with and externally fit to an outer circumferential surface of the rear end portion of the rotary shaft, wherein
   the component of the clamp mechanism includes a brake disk, and a disk holder that fixes the brake disk to the spindle,
   the outer circumferential surface of the rear end portion of the rotary shaft projecting from the rear end surface of the spindle has a fitting part that contacts with an inner circumferential surface of the component in a region in which the component of the clamp mechanism is externally fit,
   the outer circumferential surface of the rear end portion of the rotary shaft includes an escape part rearward of the fitting part, the escape part not in contact with the inner circumferential surface of the component, and
   the fitting part is arranged adjacent to the rear end surface of the spindle, wherein a length of the fitting part in an axial direction is longer than a length of the brake disk in the axial direction, and the length of the fitting part is shorter than a sum length of the brake disk and the disk holder in the axial direction.

* * * * *